United States Patent
Kubo (10) Patent No.: US 10,942,350 B2
(45) Date of Patent: Mar. 9, 2021

(54) OUTDOOR IMAGE IRRADIATION APPARATUS

(71) Applicant: KYOCERA Corporation, Kyoto (JP)

(72) Inventor: Yoshinori Kubo, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/473,801

(22) PCT Filed: Dec. 27, 2017

(86) PCT No.: PCT/JP2017/046911
§ 371 (c)(1),
(2) Date: Jun. 26, 2019

(87) PCT Pub. No.: WO2018/124183
PCT Pub. Date: Jul. 5, 2018

(65) Prior Publication Data
US 2019/0324269 A1  Oct. 24, 2019

(30) Foreign Application Priority Data

Dec. 28, 2016  (JP) .............................. JP2016-254876

(51) Int. Cl.
| | |
|---|---|
| *G03B 21/14* | (2006.01) |
| *G02B 27/01* | (2006.01) |
| *G01C 21/26* | (2006.01) |
| *G02B 5/22* | (2006.01) |
| *G02B 5/30* | (2006.01) |
| *G03B 21/16* | (2006.01) |

(52) U.S. Cl.
CPC ........... *G02B 27/01* (2013.01); *G01C 21/265* (2013.01); *G02B 5/22* (2013.01); *G02B 5/3025* (2013.01); *G03B 21/147* (2013.01); *G03B 21/16* (2013.01)

(58) Field of Classification Search
CPC ...... G03B 21/006; G03B 21/16; G03B 21/28; G03B 21/147; G02B 5/22; G02B 5/23; G02B 5/28; G02B 5/226; G02B 5/3025; G02B 27/01; G02B 27/02; G02B 27/0101
See application file for complete search history.

(56) References Cited

U.S. PATENT DOCUMENTS

| | | | |
|---|---|---|---|
| 2006/0018119 A1* | 1/2006 | Sugikawa ............... | G02B 5/26 362/231 |
| 2007/0227582 A1* | 10/2007 | Chen .................. | G02B 19/0042 136/246 |

(Continued)

FOREIGN PATENT DOCUMENTS

| | | |
|---|---|---|
| EP | 1016894 A2 | 7/2000 |
| JP | H4-288515 A | 10/1992 |

(Continued)

*Primary Examiner* — Sultan Chowdhury
(74) *Attorney, Agent, or Firm* — Procopio Cory Hargreaves and Savitch LLP (57) ABSTRACT

An outdoor image irradiation apparatus (1) includes an image light emission device (3) and a polarizer (4) for image light, and further includes a light attenuation member (5) to attenuate sunlight that comes from outside the outdoor image irradiation apparatus and enters therein. The light attenuation member (5), the polarizer (4) and the image light emission device (3) are sequentially located on an optical path for the sunlight.

12 Claims, 7 Drawing Sheets

(56) References Cited

U.S. PATENT DOCUMENTS

| | | | |
|---|---|---|---|
| 2009/0067049 A1* | 3/2009 | Nakagawa | G02B 27/1026 359/489.17 |
| 2010/0247812 A1* | 9/2010 | Yoshimura | C04B 35/443 428/1.62 |
| 2014/0177040 A1* | 6/2014 | Uehara | G02B 27/0101 359/352 |
| 2015/0177431 A1 | 6/2015 | Umehara et al. | |
| 2016/0147074 A1* | 5/2016 | Kobayashi | G02B 3/0068 345/7 |
| 2016/0357096 A1 | 12/2016 | Ichihashi et al. | |
| 2016/0377776 A1* | 12/2016 | Ichihashi | G02B 27/0101 349/11 |
| 2018/0112332 A1 | 4/2018 | Okumura et al. | |

FOREIGN PATENT DOCUMENTS

| | | |
|---|---|---|
| JP | H11-337919 A | 12/1999 |
| JP | 2002-139723 A | 5/2002 |
| JP | 2004-245914 A | 9/2004 |
| JP | 2005-313733 A | 11/2005 |
| JP | 2007-65011 A | 3/2007 |
| JP | 2015-155948 A | 8/2015 |
| WO | 2015/093620 A1 | 6/2015 |
| WO | 2016/153070 A1 | 9/2016 |

\* cited by examiner

OUTDOOR IMAGE IRRADIATION APPARATUS

TECHNICAL FIELD

The present disclosure relates to an outdoor image irradiation apparatus, such as an on-vehicle head-up display apparatus.

BACKGROUND

The on-vehicle head-up display apparatus (hereinafter referred to simply as an "HUD" apparatus) serving as an outdoor image irradiation apparatus is an apparatus designed to project, on a windshield or the like, image information displayed on a liquid crystal panel or the like by irradiating the image information. The HUD apparatus makes it possible for a driver to recognize various information, such as displayed travel speed and travel route, while keeping the driver's eyes focused on a forward view field.

As a specific configuration, Patent Document 1 describes that the HUD apparatus includes a display device including a liquid crystal cell disposed between an incident-side polarization member and an emission-side polarization member, and a light source for irradiating light to the display element. The HUD apparatus is intended to display a display image after being passed through the display device by projecting the display image onto a display member disposed within a field of view ahead of the driver. A heat transmission member (crystal heat dissipation plate) which permits transmission of the display image and is kept in contact with the emission-side polarization member, and a holding member composed of a metal material and designed to hold the heat transmission member are disposed on an optical path for the display image which extends from the liquid crystal cell to the display member. Patent Document 1 also describes that the heat transmission member is a crystal substrate.

RELATED ART DOCUMENTS

Patent Document

Patent Document 1: Japanese Unexamined Patent Publication No. 2005-313733

SUMMARY OF THE INVENTION

Problems to be Solved by the Invention

In the present disclosure, an outdoor image irradiation apparatus includes an image light emission device and a polarizer to adjust image light from the image light emission device. The outdoor image irradiation apparatus further includes a light attenuation member to attenuate sunlight. The light attenuation member, the polarizer and the image light emission device are sequentially located on an optical path for the sunlight.

DESCRIPTION OF THE EMBODIMENTS

Figure 1:
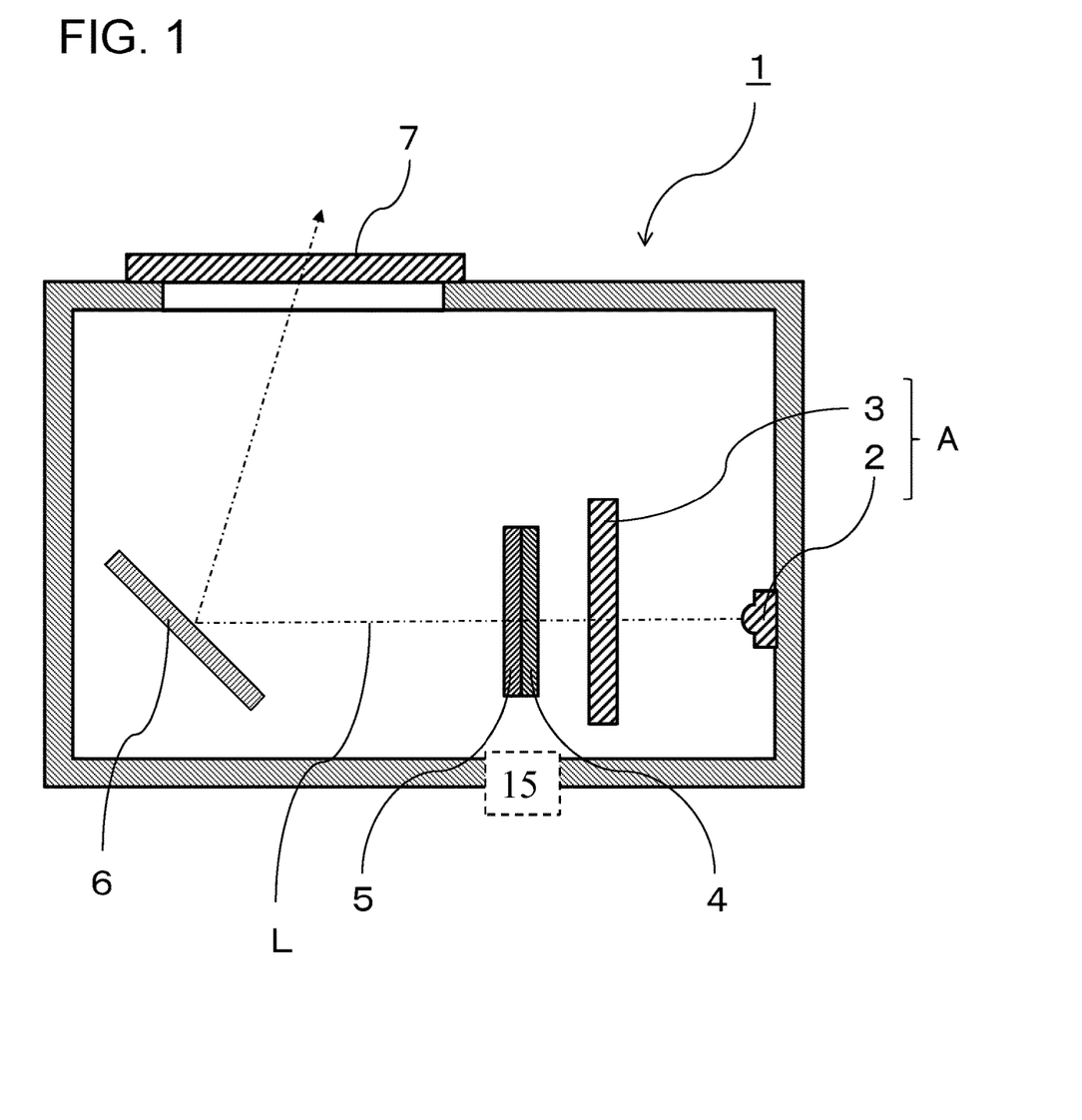
FIG. 1 is a schematic diagram of an outdoor image irradiation apparatus in a first embodiment.

An outdoor image irradiation apparatus in the present disclosure is described with reference to the drawings by exemplifying an on-vehicle HUD apparatus that is an image irradiation apparatus for a moving body. FIG. 1 is a schematic diagram of the HUD apparatus 1 in a first embodiment. The HUD apparatus 1 includes an image light emission device A, a polarizer 4, and a light attenuation member 5. The image light emission device A includes a light source 2 and an image formation part 3. The polarizer 4 is intended to polarize image light from the image formation part 3. FIG. 1 illustrates one embodiment including a mirror 6 and an emission window 7. An emission optical path L for image light containing emitted light from the light source 2 is indicated by alternate long and short dash line arrow. The light attenuation member 5, the polarizer 4 and the image light emission device A are arranged in this order on an optical path for sunlight which is reversed relative to the emission optical path L in the HUD apparatus 1 in the first embodiment. The mirror 6 is located ahead of the light attenuation member 5, and the emission window 7 is located further ahead on the optical path for sunlight in the embodiment illustrated in FIG. 1.

In cases where a vehicle with the HUD apparatus 1 mounted thereon is left in an environment exposed to sunlight and the sunlight enters from the emission window 7 in a reverse direction on the optical axis L, the sunlight entered into the HUD apparatus 1 reaches the polarizer 4 after passing through the light attenuation member 5 because the light attenuation member 5 is arranged on a side of the sunlight with respect to the polarizer 4 in the present configuration. The term "sunlight" may contain, besides direct sunlight, sunlight after passing through a vehicle window.

The light attenuation member 5 is described below in detail. When light passes through the light attenuation member 5, the light attenuation member 5 has the function of permitting transmission of part of the light and blocking another part by reflection or absorption. That is, an amount of light of emitted light outgoing from the light attenuation member 5 becomes smaller than an amount of light of incident light entering the light attenuation member 5.

The light attenuation member 5 has translucency to permit transmission of visible light that forms an image, and is capable of attenuating part of sunlight before reaching the polarizer 4. The polarizer 4 is therefore less likely to be damaged by the sunlight.

Figure 2:
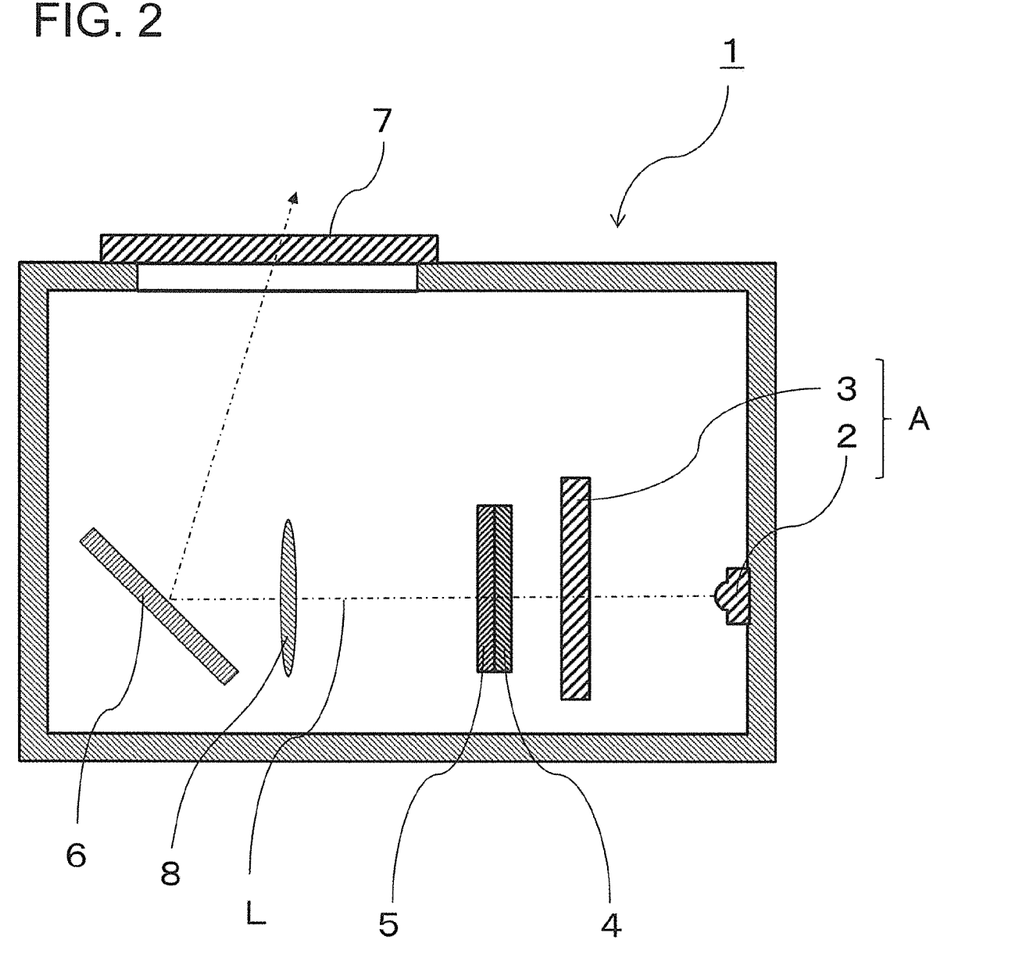
FIG. 2 is a schematic diagram of an outdoor image irradiation apparatus in a second embodiment.

FIG. 2 illustrates one embodiment further including a light diffuser member 8 disposed between the light attenuation member 5 and the mirror 6 as compared to the structure illustrated in FIG. 1. In cases where the light diffuser member 8 is disposed between the light attenuation member 5 and the mirror 6 as illustrated in FIG. 2, image light can be enlarged by the light diffuser member 8. An image of equivalent size is obtainable by corresponding downsized components, thus leading to the compact HUD apparatus 1.

Although, in terms of sunlight, the light diffuser member 8 has the function of collecting sunlight, the HUD apparatus 1 in the present embodiment is capable of reducing damage to the polarizer 4 because of the light attenuation member 5. For example, a convex lens is usable as the light diffuser member 8.

Figure 3:
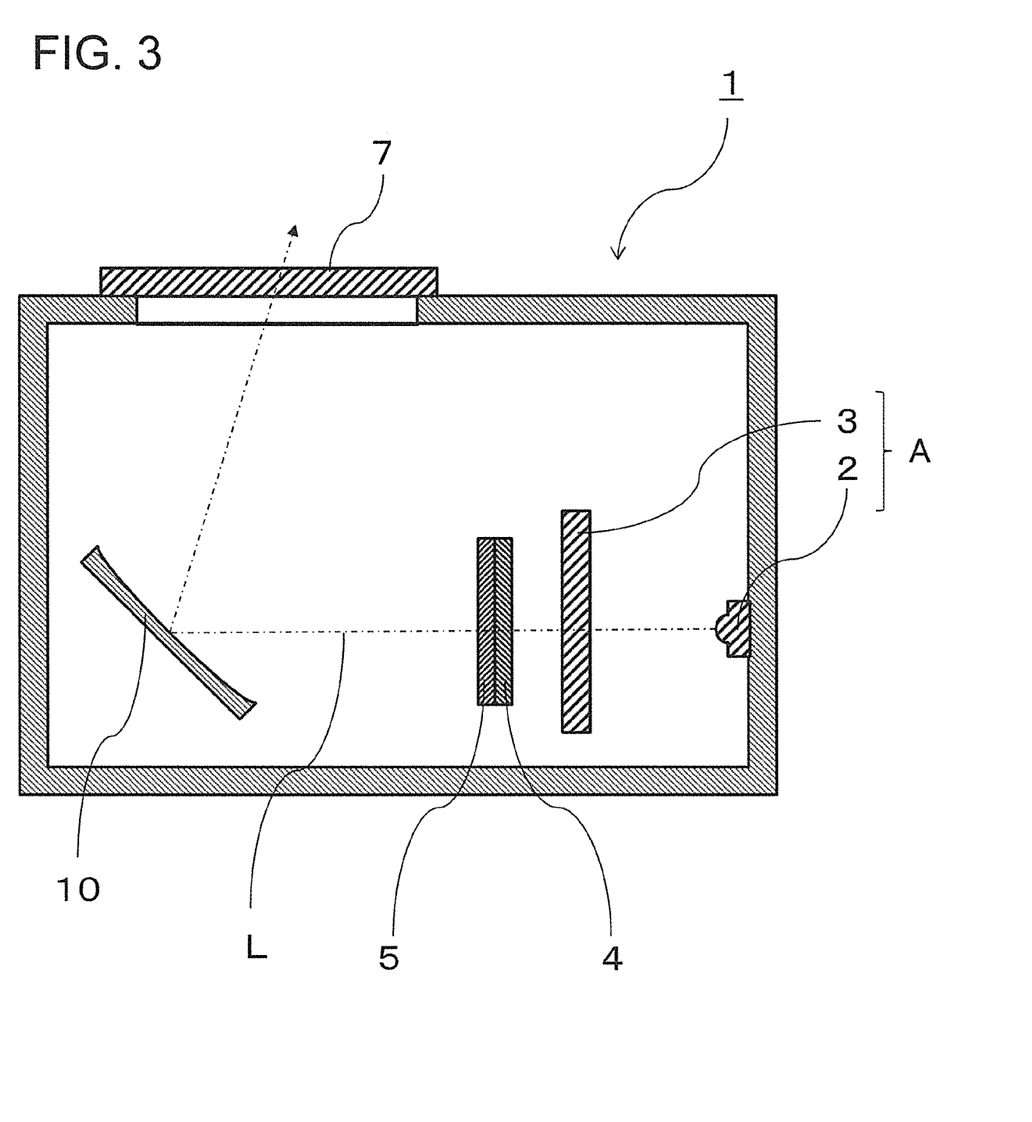
FIG. 3 is a schematic diagram of an outdoor image irradiation apparatus in a third embodiment.

FIG. 3 illustrates one embodiment including a concave mirror 10 disposed at a portion corresponding to the position of the mirror 6 in FIG. 1. The concave mirror 10 having both functions of the mirror 6 and the light diffuser member 8 contributes to decreasing the number of components.

The polarizer 4 in the HUD apparatus 1 is designed to generate heat also by emitted light from the image light emission device A. Therefore, from the viewpoint of cooling the polarizer 4, the light attenuation member 5 may be kept in contact with the polarizer 4. When satisfying this configuration, it is possible to cool the polarizer 4 and block part of sunlight. The polarizer 4 is therefore less likely to be damaged by the sunlight, and the polarizer 4 is also less likely to be damaged by heat. The light attenuation member 5 is kept in contact with the polarizer 4 in the embodiment in FIG. 1. In cases where the polarizer 4 is kept in contact with the light attenuation member 5, the effect of cooling the polarizer 4 can be enhanced because heat transfer therebetween is carried out by heat conduction between solid bodies. The polarizer 4 may be directly formed on a surface of the light attenuation member 5, or alternatively both may be bonded together by interposing an adhesive layer therebetween.

FIG. 1 illustrates the embodiment that the light attenuation member 5 is kept in contact with the polarizer 4 and both have the same size. Alternatively, the light attenuation member 5 may be made larger than the polarizer 4. When satisfying this configuration, heat dissipation can be improved because of an increased surface area of the light attenuation member 5.

Still alternatively, the light attenuation member 5 may be disposed close to the polarizer 4. The polarizer 4 may be kept away from the light attenuation member 5 as long as the light attenuation member 5 is close to the polarizer 4 within a range in which the polarizer 4 can be cooled. In this case, heat transfer therebetween is carried out via gas existing therebetween. In cases where the polarizer 4 is kept away from the light attenuation member 5, a distance therebetween is preferably 0.1-50 mm.

The light attenuation member 5 is not designed to uniformly attenuate lights over all wavelengths. Attenuation rates of the lights of individual wavelengths differ depending on a material used for the light attenuation member 5.

Examples of materials usable for the light attenuation member 5 include single crystals such as crystal and sapphire, and glass such as quartz glass and borosilicate glass. Crystal is single crystal of quartz glass, and sapphire is single crystal of aluminum oxide. The single crystal has higher thermal conductivity (a greater value in terms of thermal conductivity) than glass. For example, glass has a thermal conductivity of approximately 0.5-1.0 W/m·K. In contrast, crystal has a thermal conductivity of 6.2-10.4 W/m·K, and sapphire has an excellent thermal conductivity of 42 W/m·K. Sapphire has high mechanical strength and high visible light transmittance of 80% or more.

The light attenuation member 5 may have a smaller average value of transmittance in a wavelength region of 200-400 nm than an average value of transmittance in a wavelength region of 400-800 nm. The light attenuation member 5 that fulfills the above configuration is capable of attenuating light of so-called ultraviolet light region. The polarizer 4 is therefore less likely to be damaged due to alteration of the polarizer 4.

The light attenuation member 5 may have a smaller average value of transmittance in a wavelength region of 800-2500 nm than the average value of transmittance in the wavelength region of 400-800 nm. The light attenuation member 5 that fulfills the above configuration is capable of attenuating light of so-called infrared light region. The polarizer 4 is therefore less likely to be heated due to infrared light.

The light attenuation member 5 may be designed so that each of the average value of transmittance in the wavelength region of 200-400 nm and the average value of transmittance in the wavelength region of 800-2500 nm is smaller than the average value of transmittance in the wavelength region of 400-800 nm. With the use of this light attenuation member 5, the polarizer 4 is less likely to be damaged due to ultraviolet light, and the polarizer 4 is less likely to be heated due to infrared light.

The light whose wavelength range is 400-800 nm is so-called visible light.

The light attenuation member 5 may have a smaller maximum value of transmittance in the wavelength region of 200-400 nm than a maximum value of transmittance in the wavelength region of 400-800 nm. This light attenuation member 5 makes it easier to reduce damage to the polarizer 4 because the transmittances in all the regions in the ultraviolet light region are lower than a maximum value of transmittance in the visible light region.

Alternatively, the light attenuation member 5 may have a smaller maximum value of transmittance in the wavelength region of 800-2500 nm than the maximum value of transmittance in the wavelength region of 400-800 nm. With the use of this light attenuation member 5, transmittances in all the regions in the infrared light region become lower than the maximum value of transmittance in the visible light region. The polarizer 4 is much less likely to be heated.

These transmittances are measurable, for example, by using an UV-Visible Spectrophotometer UV-3100PC manufactured by Shimadzu Corporation. Measuring conditions are, for example, scanning speed: high speed, sampling pitch: 2.0 nm, and slit width: 2.0 nm.

Materials having a low ultraviolet light transmittance and a low infrared light transmittance are described below. Sapphire free from crystal defects, impurities and additives also has a relatively high transmittance with respect to ultraviolet light and infrared light besides visible light. A transmittance in light having a specific wavelength can be lowered by introducing crystal defects into sapphire or by adding additives thereto.

For example, sapphire, which has an absorption band in the ultraviolet region and is capable of decreasing ultraviolet light is manufacturable by adding a proper amount of at least one of Fe, Co, Ni, Ti, Cr, Mo and W to a sapphire material so as to let sapphire crystals grow. For example, sapphire obtained by adding Ti is capable of decreasing ultraviolet light because $Ti^{4+}$ has an absorption bands in 230 nm and 240 nm that are ultraviolet light regions.

An amount of addition is preferably 3 ppm or more, more preferably 5 ppm or more. The amount of addition of additives needs to be suitably adjusted.

It is also possible to manufacture sapphire which has an absorption band in the ultraviolet region and is capable of decreasing ultraviolet light by introducing a defect due to oxygen voids into sapphire while an atmosphere during sapphire crystal growth or during heat treatment after the growth is controlled in a reduction atmosphere.

The sapphire having the defect due to the oxygen voids has defects respectively referred to as F center and F center+. The F center has an absorption band in 210 nm. The F center+ has absorption bands in 210 nm, 230 nm and 260 nm. The ultraviolet light can be attenuated by using, as the light attenuation member 5, the sapphire having an absorption band in a wavelength region of 205-260 nm.

Optical characteristics of sapphire are also affected by the kind of a manufacturing method. In the case of sapphire manufactured, for example, by HEM (Heat Exchange Method), an average value of transmittance in the visible light region is high, namely, 85%, and an average value of transmittance in the ultraviolet light region is low, namely, 70%. By using, as the light attenuation member 5, the sapphire having a large difference in terms of average value of transmittance, it is possible to permit transmission of visible light while reducing ultraviolet light.

As in the case of measuring transmittance, the absorption bands are measurable by using the UV-Visible Spectrophotometer UV-3100PC manufactured by Shimadzu Corporation.

As a material having a low transmittance in infrared light, there are crystal and fused quartz whose OH group is known to absorb infrared ray. As a near-infrared absorption pigment, cyanine compound, phthalocyanine compound, dithiol metal complex, naphthoquinone compound, diimmonium compound and azo compound have been known. The light attenuation member 5 containing these pigments on a surface thereof is usable as the light attenuation member 5 having a low transmittance in infrared light.

The light attenuation member 5 may have a color depending on the kind and amount of addition of additives. The HUD apparatus 1 mounted on a vehicle needs to display images for informing a passenger of relatively simple information. For example, monochromatic blue light, monochromatic green light and monochromatic red light, and their combinations can be used, and the light attenuation member 5 may be suitably colored. A color concentration of the light attenuation member 5 may be adjusted depending on the purpose. The term "having a color" denotes being colored to a recognizable degree when viewed by human eyes.

A relationship between a thickness of the light attenuation member 5 and optical characteristics is described below. Transmittance $T(\lambda)$ in light of a wavelength $\lambda$ entered into the light attenuation member 5 can be expressed as a function of light absorption coefficient $\alpha(\lambda)$ and a thickness t of the light attenuation member 5:

$$T(\lambda)=e^{-\alpha(\lambda)t}$$

That is, the transmittance T decreases exponentially relative to the thickness t. By appropriately selecting the thickness of the light attenuation member 5, a transmittance in a wavelength region unnecessary for an image display, for example, infrared light and ultraviolet light can be lowered while keeping a high transmittance in the light in a wavelength region used for the image display. For example, when the light attenuation member 5 is composed of a plate-shaped sapphire substrate, a thickness thereof needs to be 0.5 mm or more and 5 mm or less.

A material used as the light attenuation member 5 is preferably sapphire from the viewpoint of excellent strength and heat conduction. Because the sapphire has anisotropy, there could be various combinations of relationship between both the optical path and the polarizer 4 and crystal orientation of the sapphire.

The following is a description of a relationship between the anisotropy and optical characteristics of the sapphire. In terms of optical characteristics, the sapphire has birefringence (dividing transmitted light into two rays) with respect to light that propagates in a direction inclined relative to c-axis. In contrast, the sapphire does not have birefringence relative to light in a direction parallel to the c-axis. By arranging c-plane of the sapphire substrate so as to oppose to the polarizer 4, image light after outgoing from the image light emission device A and passing through the polarizer 4 enters the c-plane of the sapphire substrate, thereby reducing distortion and blurring of an image. In cases where a distance between the light attenuation member 5 and the display part is small, namely, 2 m or less, an a-plane, an m-plane and an r-plane may be arranged so as to oppose to the polarizer 4.

Figure 4:
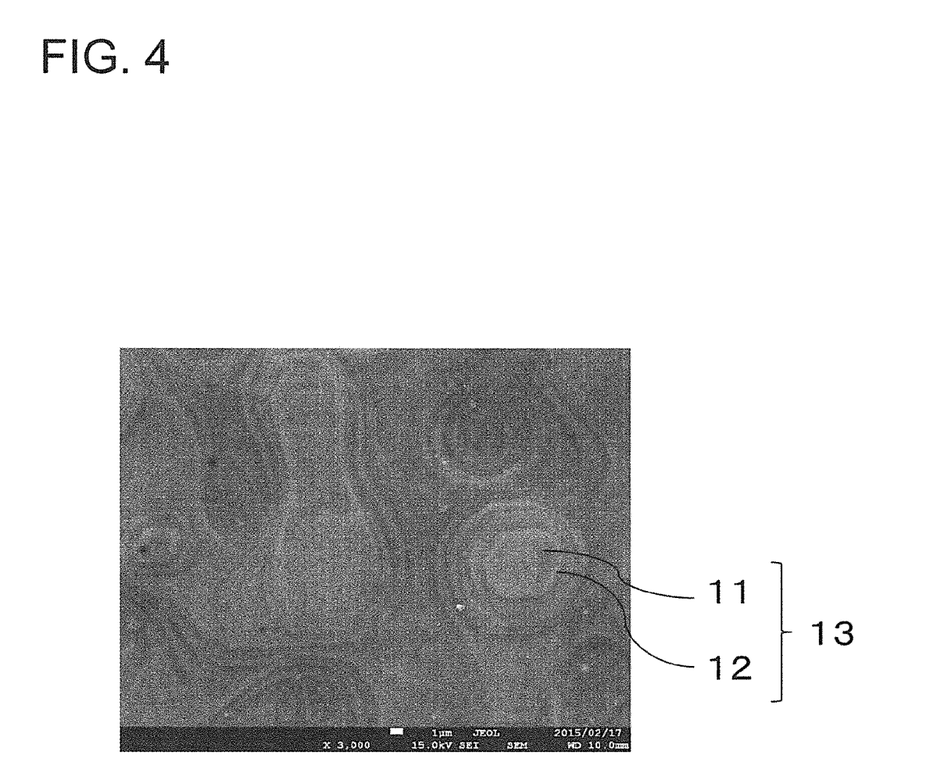
FIG. 4 is an electron microscope (SEM) photograph of a sapphire substrate and a terrace structure layer photograph.

After a rectangular sapphire is subjected to heat treatment under specific conditions, irregularities occur on a surface according to crystal orientation as illustrated in FIG. 4. A terrace surface 11 is a surface extending in a flat surface shape. A side surface 12 is a surface which is kept in contact with an edge line of one terrace surface and which extends vertically relative to other terrace surface 11. A terrace structure layer 13 composed of the terrace surface 11 and the side surface 12 has a concave-convex shape and therefore has a greater surface area than the case of not having the irregularities. The terrace surface 11 in the terrace structure layer 13 has an area of 1 μm square or more, and a width of the terrace surface 11 is approximately 1-10 μm. A height of the side surface 12 is a height at which it is possible to perceive at least an edge at a boundary between the terrace surface 11 and the side surface 12 in an observation at approximately 3,000 times magnification by an electron microscope.

FIG. 4 is an electron microscope (SEM) image at 3,000 times magnification illustrating the terrace structure layer 13.

Although sapphire originally has high thermal conductivity, a part thereof including the terrace structure layer 13 actively carries out heat exchange with air. That is, the part including the terrace structure layer 13 has high heat dissipation effect. The heat dissipation effect is further improved by using the sapphire substrate including a plurality of the terrace layer structures 13 located in at least a part of the sapphire substrate.

As specific conditions for the heat treatment, the sapphire substrate is retained at a temperature of 1800° C. or above and not exceeding 2000° C. for five hours or more, and the sapphire is thereafter cooled to room temperature during cooling time of six hours or more. The heat treatment step is carried out in an inert gas atmosphere, such as argon, or in vacuum. Consequently, rearrangement of atoms and crystal defects proceeds in the surface and interior of the sapphire, thereby reducing micro cracks, the crystal defects and internal stress formed in the surface and interior thereof during a processing step.

Heat dissipation properties can be improved by disposing the terrace structure layer 13 on the entire surface of the sapphire substrate.

In the case of using the rectangular sapphire substrate, the terrace structure layer 13 is easily generated by arranging so that the m-axis of sapphire does not vertically intersect with the surface. In particular, the terrace structure layer 13 is easily generated by arranging so that the c-axis or the a-axis of sapphire vertically intersects with the surface. The use of the sapphire substrate including the terrace layer structure 13 over the entire surface contributes to increasing the surface area, thus leading to enhanced heat dissipation properties than the sapphire substrate not including the terrace structure layer 13.

In the case of disposing the terrace structure layer 13 on surfaces of the sapphire substrate other than a surface facing the polarizer 4 and a reverse surface thereof, the surface facing the polarizer 4 and the reverse surface thereof in the sapphire substrate need to vertically intersect with the m-axis of the sapphire, and the other surfaces need not to vertically intersect with the m-axis of the sapphire. By so doing, the terrace structure layer 13 is formable, after the heat treatment, on the surfaces of the sapphire substrate other than the surface facing the polarizer 4 and the reverse surface thereof.

Alternatively, after the heat treatment, a polishing process may be applied to the surface facing the polarizer 4 and the reverse surface thereof, namely, only the surfaces through which image light and sunlight come in and the image light and the sunlight go out.

As the light attenuation member 5, for example, sapphire, crystal and glass whose transmittance in light of a specific wavelength is controlled by controlling defects or additives may be used. Alternatively, a layer composed of a material that absorbs or reflects the light of the specific wavelength may be formed on a major surface of the light attenuation member 5 or in an interior thereof.

The light attenuation member 5 may be a combination of a plurality of light attenuation members 5, each with different optical characteristics. For example, light in the ultraviolet region and light in the infrared region contained in sunlight can be decreased by combining a sapphire substrate having a low transmittance in the ultraviolet region and a crystal substrate or a quartz glass substrate having a low transmittance in the infrared region.

Figure 5:
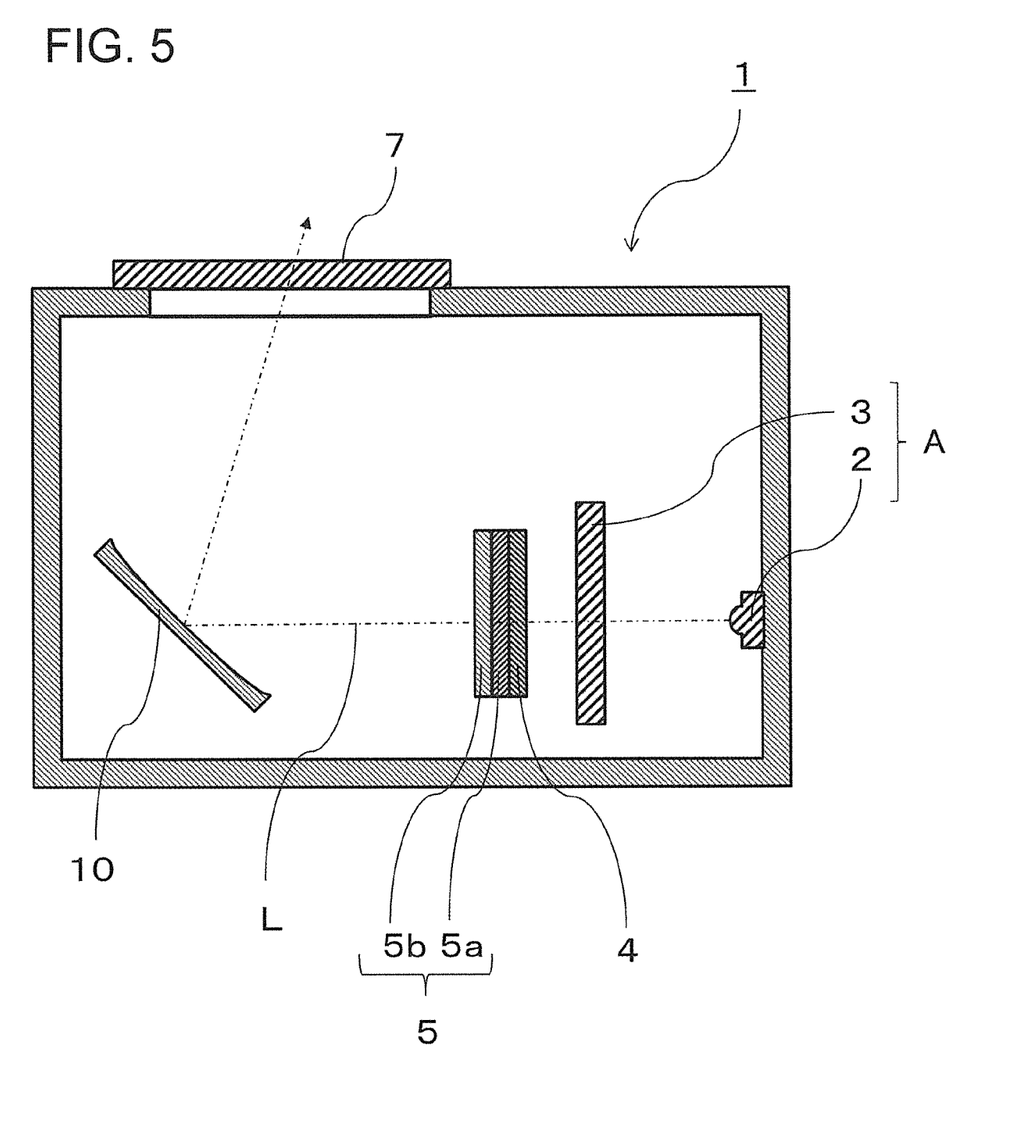
FIG. 5 is a schematic diagram of an outdoor image irradiation apparatus in a fourth embodiment.

FIG. 5 illustrates one embodiment of a combination of a plurality of light attenuation members 5. One of the light attenuation members 5 is a plate-shaped sapphire substrate 5a, and the other is a crystal substrate 5b or a quartz glass substrate 5b. The crystal substrate 5b or the quartz glass substrate 5b, the sapphire substrate 5a, the polarizer 4 and the image light emission device A are sequentially arranged on an optical path for sunlight. The light in the infrared region can first be decreased by the crystal substrate 5b or the quartz glass substrate 5b, and the light in the ultraviolet region can be decreased by the sapphire substrate 5a. With the above arrangement, it is possible to obtain such a structure that the sapphire substrate 5a is interposed between the polarizer 4 and the crystal substrate 5b or the quartz glass substrate 5b, each tending to be heated due to the decreased light in the infrared region. The polarizer 4 is therefore less likely to be heated.

In the above embodiment, the light attenuation member 5 includes the sapphire substrate 5a and also includes the crystal substrate 5b or the quartz glass substrate 5b. Alternatively, borosilicate glass having a low transmittance in each of the ultraviolet region and the infrared region may be used as the light attenuation member 5. Still alternatively, this light attenuation member 5 may be combined with the sapphire substrate 5a having a high thermal conductivity.

The HUD apparatus 1 may be designed so that the light attenuation member 5 is cooled with airflow. Cooling with the airflow may be carried out by using a blower 15, such as a fan for air-cooling the light attenuation member 5. Alternatively, airflow caused by movement of a moving body, such as a vehicle, may be used. In order to improve cooling effect, a cooling fin may be coupled to the light attenuation member 5. The cooling fin needs to be disposed on at least a portion of a region of the light attenuation member 5 other than a light irradiation range.

Figure 6:
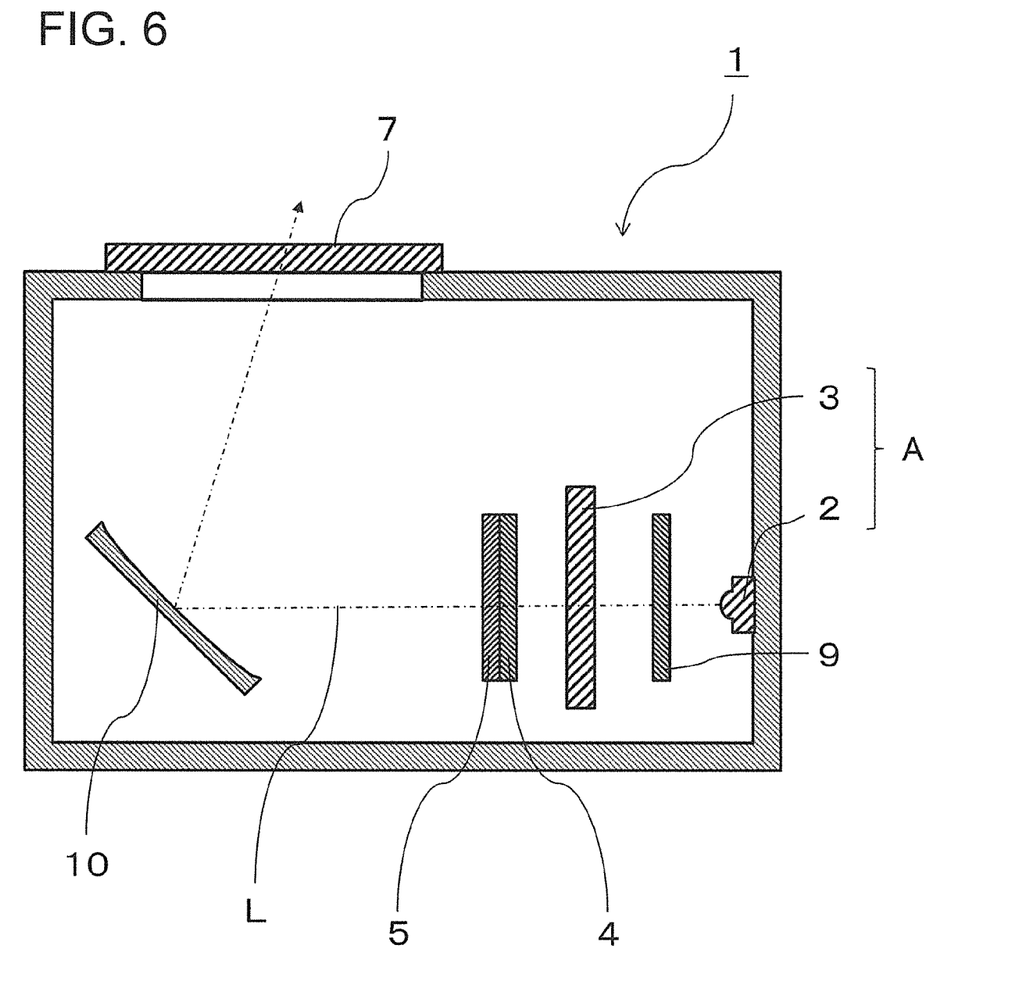
FIG. 6 is a schematic diagram of an outdoor image irradiation apparatus in a fifth embodiment.

As illustrated in FIG. 6, the HUD apparatus 1 may include an incident-side polarizer 9 disposed between the light source 2 and the image formation part 3 in addition to the polarizer 4 disposed between the image formation part 3 and the light attenuation member 5. In this case, light from the light source 2 sequentially passes through the incident-side polarizer 9, the image formation part 3, a first polarizer 4a and the light attenuation member 5. The light attenuation member 5 has the function of cooling the polarizer 4.

Figure 7:
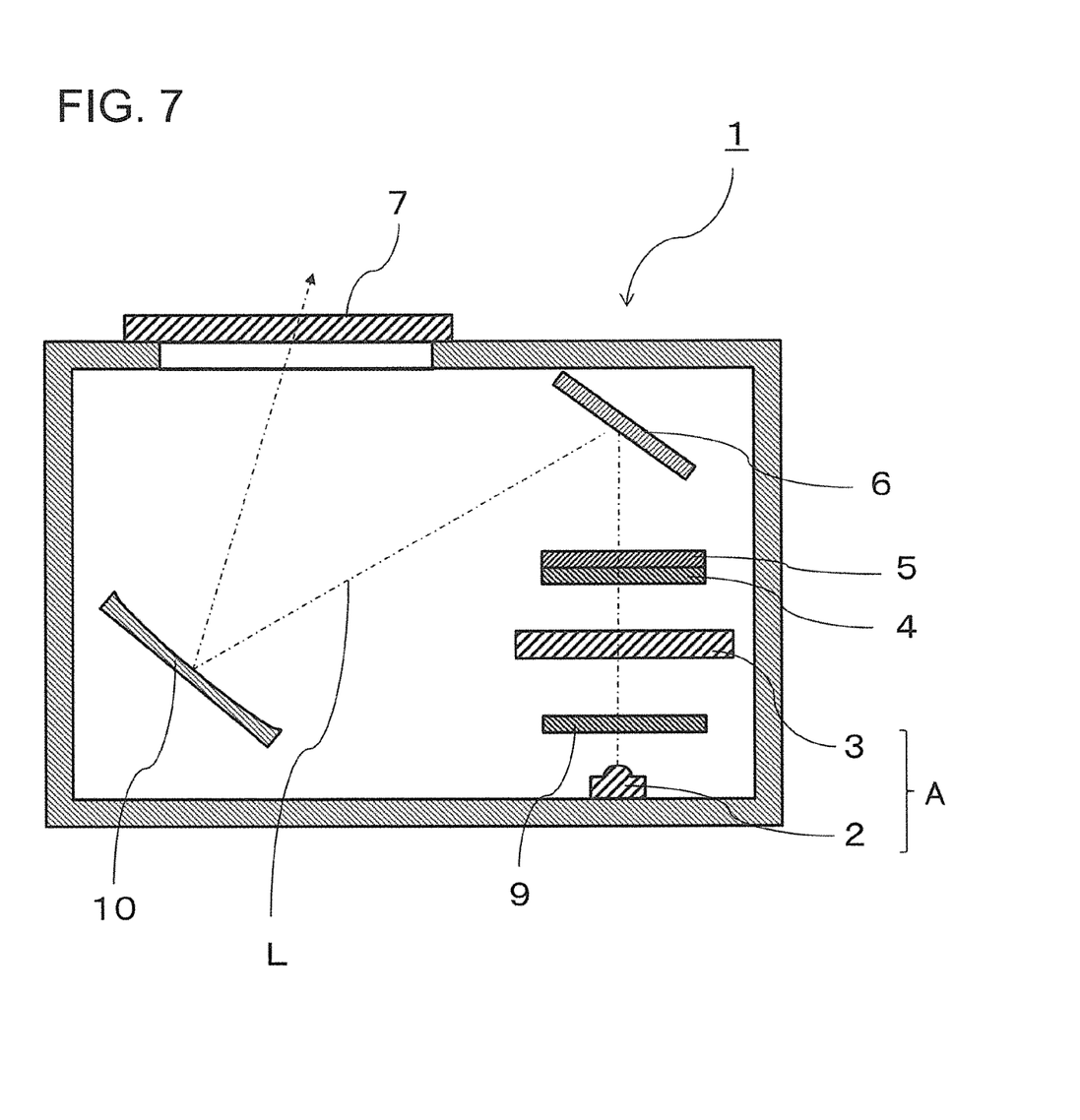
FIG. 7 is a schematic diagram of an outdoor image irradiation apparatus in a sixth embodiment.

As illustrated in FIG. 7, instead of the configuration of the HUD apparatus 1, a positional relationship between the polarizer 4 and the light attenuation member 5 may be changed so that the light attenuation member 5 is disposed above the polarizer 4. It becomes easy to carry out cooling using air convection.

While the embodiments of the present invention have been described above, the present invention is not limited to the above embodiments and various improvements and changes may be made without departing from the gist of the present invention. For example, the outdoor image irradiation apparatus is not limited to on-vehicle ones intended for an image irradiation apparatus for a moving body. The outdoor image irradiation apparatus may be designed to perform projection onto ships, airplanes, goggles, helmets, and buildings. The display part may be, for example, a mirror besides a windshield. It should be noted that the display part is present even in cases where the moving body is a vehicle or the like and it is configured to make a person recognize a virtual image on the other side of the windshield seen from a seating position of the person.

DESCRIPTION OF THE REFERENCE NUMERAL 1 outdoor image irradiation apparatus (HUD apparatus)
2 light source
3 image formation part
A image light emission device
4 polarizer
5 light attenuation member
5a first light attenuation member
5b second light attenuation member
6 mirror
7 emission window
8 light diffuser member
9 incident-side polarizer
10 concave mirror
11 terrace surface
12 side surface
13 terrace structure layer

The invention claimed is:

1. An outdoor image irradiation apparatus, comprising:
an image light emission device,
a polarizer for image light,
a light attenuation member that absorbs a part of a wavelength region of sunlight, and
a light diffuser member to enlarge the image light,
wherein the light diffuser member, the light attenuation member, the polarizer, and the image light emission device are sequentially located on an optical path for the sunlight.

2. The outdoor image irradiation apparatus according to claim 1, wherein the light attenuation member is in contact with the polarizer.

3. The outdoor image irradiation apparatus according to claim 1, wherein the light attenuation member comprises sapphire.

4. The outdoor image irradiation apparatus according to claim 1, wherein the light attenuation member comprises a crystal substrate or a quartz glass substrate.

5. The outdoor image irradiation apparatus according to claim 1, further comprising: a blower for air-cooling the light attenuation member.

6. An outdoor image irradiation apparatus, comprising:
an image light emission device,
a polarizer for image light, and
a light attenuation member that absorbs a part of a wavelength region of sunlight,
wherein the light attenuation member, the polarizer, and the image light emission device are sequentially located on an optical path for the sunlight, and
wherein the light attenuation member has a smaller average value of transmittance in a wavelength region of 200-400 nm than an average value of transmittance in a wavelength region of 400-800 nm.

7. An outdoor image irradiation apparatus, comprising:
an image light emission device,
a polarizer for image light, and
a light attenuation member that absorbs a part of a wavelength region of sunlight,
wherein the light attenuation member, the polarizer, and the image light emission device are sequentially located on an optical path for the sunlight, and
wherein the light attenuation member has a smaller average value of transmittance in a wavelength region of 800-2500 nm than the average value of transmittance in the wavelength region of 400-800 nm.

8. An outdoor image irradiation apparatus, comprising:
an image light emission device,
a polarizer for image light, and
a light attenuation member that absorbs a part of a wavelength region of sunlight,
wherein the light attenuation member, the polarizer, and the image light emission device are sequentially located on an optical path for the sunlight,
wherein the light attenuation member comprises sapphire, and
wherein the sapphire has an absorption band in a wavelength region of 205-260 nm.

9. An outdoor image irradiation apparatus, comprising:
an image light emission device,
a polarizer for image light, and
a light attenuation member that absorbs a part of a wavelength region of sunlight,
wherein the light attenuation member, the polarizer, and the image light emission device are sequentially located on an optical path for the sunlight,
wherein the light attenuation member comprises sapphire, and
wherein the sapphire comprises 3 ppm or more of at least one of Fe, Co, Ni, Ti, Cr, Mo and W.

10. An outdoor image irradiation apparatus, comprising:
an image light emission device,
a polarizer for image light, and
a light attenuation member that absorbs a part of a wavelength region of sunlight,
wherein the light attenuation member, the polarizer, and the image light emission device are sequentially located on an optical path for the sunlight,
wherein the light attenuation member comprises sapphire, and
wherein the sapphire in the light attenuation member comprises a plate-shaped sapphire substrate having a thickness of 0.5 mm or more and 5 mm or less.

11. An outdoor image irradiation apparatus, comprising:
an image light emission device,
a polarizer for image light, and
a light attenuation member that absorbs a part of a wavelength region of sunlight,
wherein the light attenuation member, the polarizer, and the image light emission device are sequentially located on an optical path for the sunlight,
wherein the light attenuation member comprises sapphire, and
wherein the sapphire comprises a plurality of terrace structure layers located on any plane of the sapphire, each terrace structure layer of the plurality of terrace structure layers comprising a terrace surface and a side surface that is in contact with an edge line of the terrace surface.

12. An outdoor image irradiation apparatus, comprising:
an image light emission device,
a polarizer for image light, and
a light attenuation member that absorbs a part of a wavelength region of sunlight and comprises a sapphire substrate,
wherein the light attenuation member comprises a crystal substrate or a quartz glass substrate, and
wherein the crystal substrate or the quartz glass substrate, the sapphire substrate, the polarizer, and the image light emission device are sequentially located on an optical path for the sunlight.

* * * * *